(12) United States Patent
Liu et al.

(10) Patent No.: US 11,143,773 B1
(45) Date of Patent: Oct. 12, 2021

(54) THREE-COMPONENT SEISMIC DATA PROCESSING AND INTERPRETATION METHOD FOR SEISMIC WHILE FRACKING

(71) Applicant: Saudi Arabian Oil Company, Dhahran (SA)

(72) Inventors: Yujin Liu, Beijing (CN); Yue Du, Beijing (CN); Tong Wang Fei, Dhahran (SA); Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/840,903

(22) Filed: Apr. 6, 2020

(51) Int. Cl.
*G01V 1/32* (2006.01)
*G01V 1/34* (2006.01)
*H04L 29/08* (2006.01)

(52) U.S. Cl.
CPC .............. *G01V 1/32* (2013.01); *G01V 1/345* (2013.01); *H04L 67/12* (2013.01)

(58) Field of Classification Search
CPC .................................. G01V 1/32; G01V 1/345
See application file for complete search history.

(56) References Cited

U.S. PATENT DOCUMENTS

| 7,796,468 B2 * | 9/2010 | Kellogg | G01V 1/28 367/31 |
|---|---|---|---|
| 2015/0160358 A1 | 6/2015 | Bongiovanni | |
| 2017/0176622 A1 | 6/2017 | Lemarenko et al. | |
| 2018/0320514 A1 | 11/2018 | Felkl et al. | |
| 2019/0310386 A1 | 10/2019 | Quan et al. | |

OTHER PUBLICATIONS

Ghahfarokhi et al., Seismic Attributes Application for the Distributed Acoustic Sensing Data for the Marcellus Shale: New Insights to Cross-Stage Flow Communication, Jan. 23-25, 2018, SPE Hydraulic Fracturing Technology Conference & Exhibition, The Woodlands, Texas, 20 pp. (Year: 2018).*
One Petro Search Results, Apr. 6, 2021, 3 pp. (Year: 2021).*

(Continued)

*Primary Examiner* — Toan M Le
(74) *Attorney, Agent, or Firm* — Fish & Richardson P.C.

(57) ABSTRACT

Systems and methods include a computer-implemented method for presenting interpretation results of synchronized seismic data and fracture treatment times. A standard format seismic dataset of sensor readings obtained from a three-component sensor is generated. Coordinates and recording times corresponding to the sensor readings are added to the standard format seismic dataset. Synchronized seismic data is generated from the standard format seismic dataset by synchronizing seismic recording times with fracture treatment times. Quality-controlled synchronized seismic data is generated by removing dead traces and abnormal data samples from the synchronized seismic data. A time-frequency analysis is performed on the quality-controlled synchronized seismic data, including performing short-time Fourier transforms to analyze variations of Fourier spectra over time. Based on the time-frequency analysis, resonance frequencies are extracted from each frequency spectrum at different time samples. Interpretation results based are presented to a user.

20 Claims, 8 Drawing Sheets

(56) References Cited

OTHER PUBLICATIONS

Carey et al., "Analysis of water hammer signatures for fracture diagnostic,": Presented at the SPE Annual Technical Conference and Exhibition, Society of Petroleum Engineers, SPE 174866-MS, Sep. 28-30, 2015, 26 pages.
Dunham et al., "Hydraulic fracture conductivity inferred from tube wave reflection,". In SEG Technical Program Expanded Abstracts 2017 (pp. 947-952). Society of Exploration Geophysicists, 6 pages.
Liang et al., "Hydraulic fracture diagnostics from Krauklis-wave resonance and tube-wave reflections," Geophysics, 82(3): D171-D186, May-Jun. 2017, 16 pages.
Tang et al., "A dynamic model for fluid flow in open borehole fractures," Journal of Geophysical Research: Solid Earth, 94, 7567-7576, Jun. 10, 1989, 10 pages.
PCT International Search Report and Written Opinion in International Appln. No. PCT/US2021/025970, dated Jul. 16, 2021, 14 pages.

\* cited by examiner

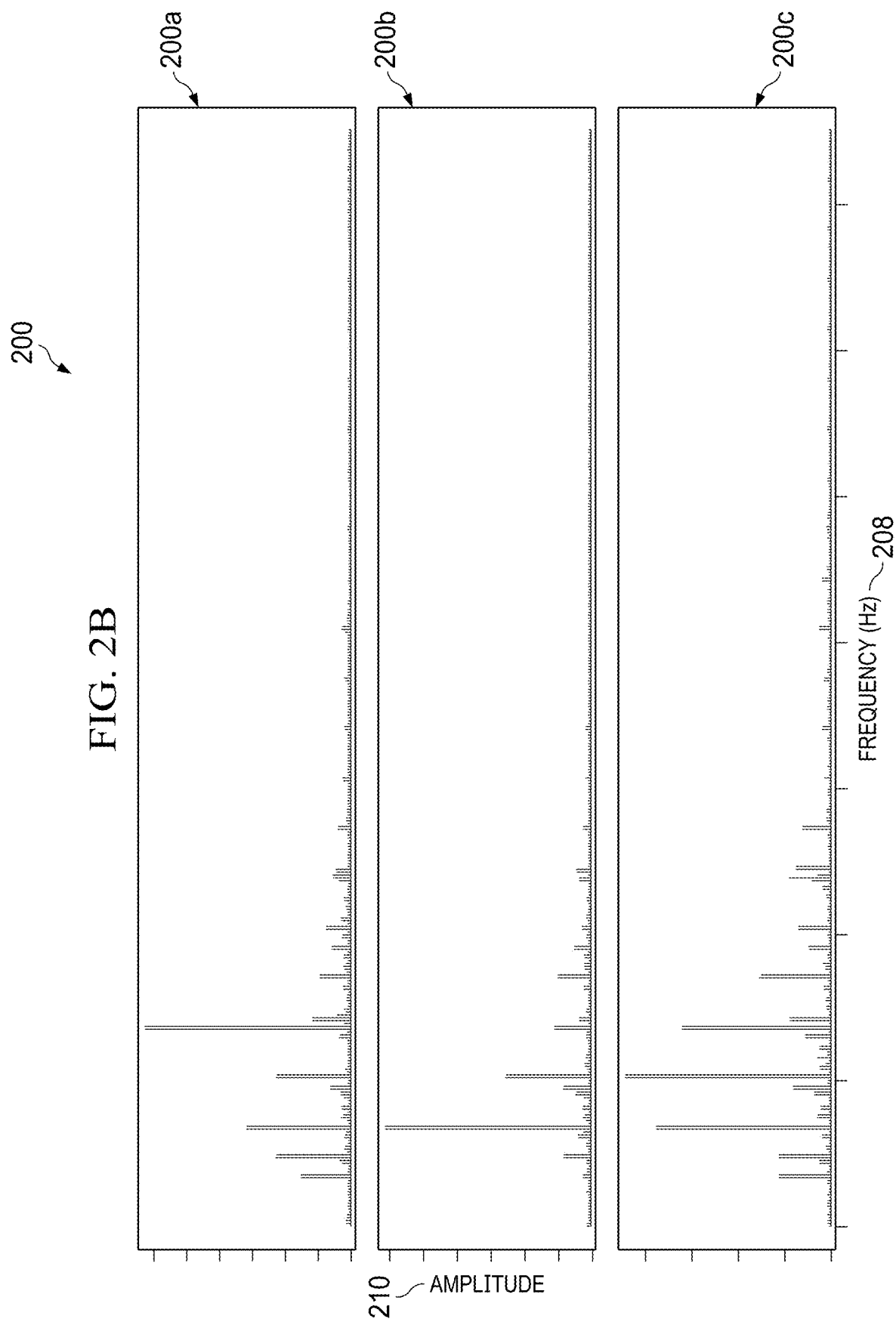

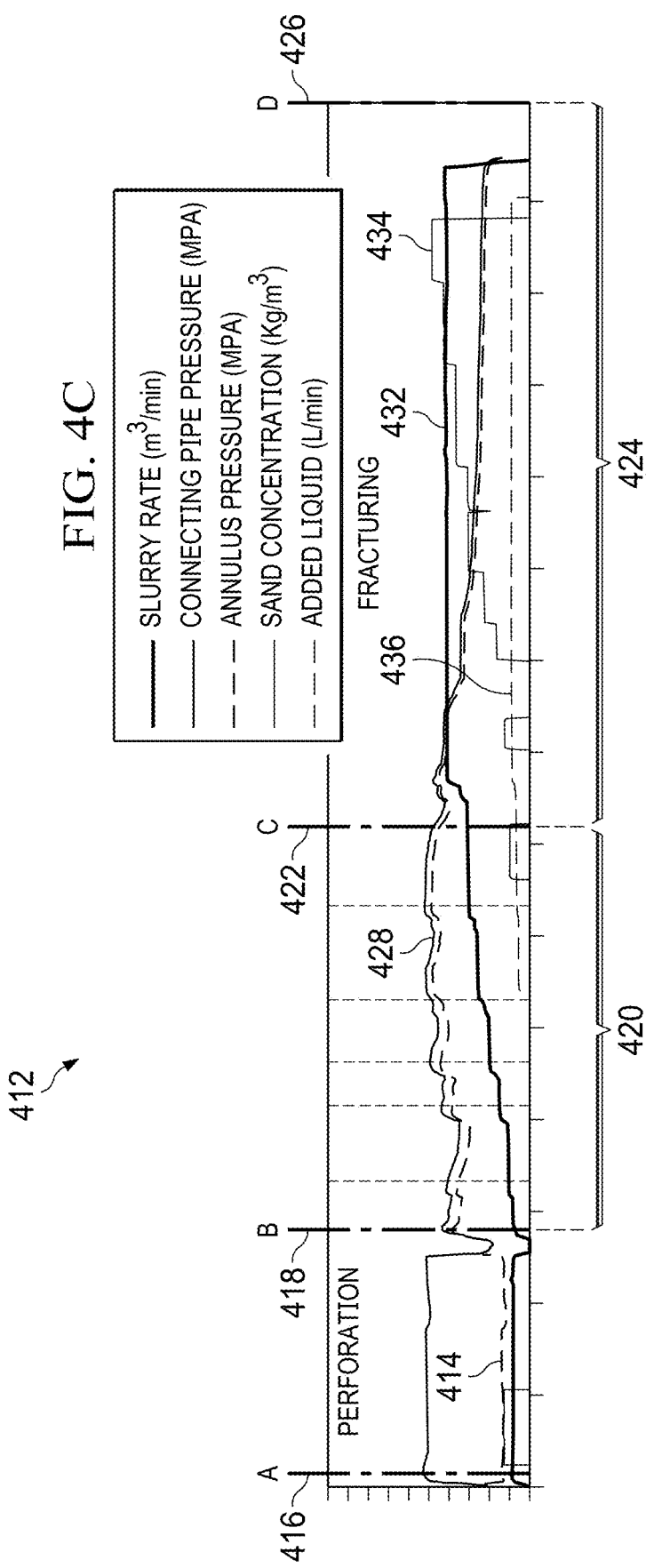

THREE-COMPONENT SEISMIC DATA PROCESSING AND INTERPRETATION METHOD FOR SEISMIC WHILE FRACKING

BACKGROUND

The present disclosure applies to techniques for monitoring fracturing (or fracking) processes.

Seismic While Fracking (SWF) is a seismic technique that is used to evaluate the quality of hydraulic fractures during fracking. Conventional SWF techniques can include microseismic monitoring methods that may require many sensors. The conventional techniques may also require significant processing time and computing resources, and may be labor intensive.

SUMMARY

The present disclosure describes techniques that can be used for generating interpretation results based on synchronized seismic data and fracture treatment times.

In some implementations, a computer-implemented method includes the following. A standard format seismic dataset of sensor readings obtained from a three-component sensor is generated. Coordinates and recording times corresponding to the sensor readings are added to the standard format seismic dataset. Synchronized seismic data is generated from the standard format seismic dataset by synchronizing seismic recording times with fracture treatment times. Quality-controlled synchronized seismic data is generated by removing dead traces and abnormal data samples from the synchronized seismic data. A time-frequency analysis is performed on the quality-controlled synchronized seismic data, including performing short-time Fourier transforms to analyze variations of Fourier spectra over time. Based on the time-frequency analysis, resonance frequencies are extracted from each frequency spectrum at different time samples. Interpretation results based are presented to a user.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, the techniques described in the present disclosure can provide an improvement over conventional techniques that use body waves that are scattered from the fractures. Body waves can tend to be weak and thus can require wide-azimuth and dense receiver arrays to reconstruct the wave field. By comparison, the techniques described in the present disclosure can instead use tube waves, which propagate within the wellbore with less energy dissipation, thus requiring fewer receivers. Second, one or a few three-component sensors can be determined to be effective at recording the reflected tube waves. Third, the techniques of the present disclosure can reduce computational, manpower, and delivery costs. Fourth, the techniques of the present disclosure can provide an efficient and reliable evaluation of fracturing quality using reflected tube waves.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIGS. 2A and 2B are diagrams showing raw data for sensor recordings, according to some implementations of the present disclosure.

FIGS. 4A-4C are diagrams showing an interpretation of seismic data acquired at a 15th stage of fracturing, according to some implementations of the present disclosure.

Like reference numbers and designations in the various drawings indicate like elements.

DETAILED DESCRIPTION

Figure 1:
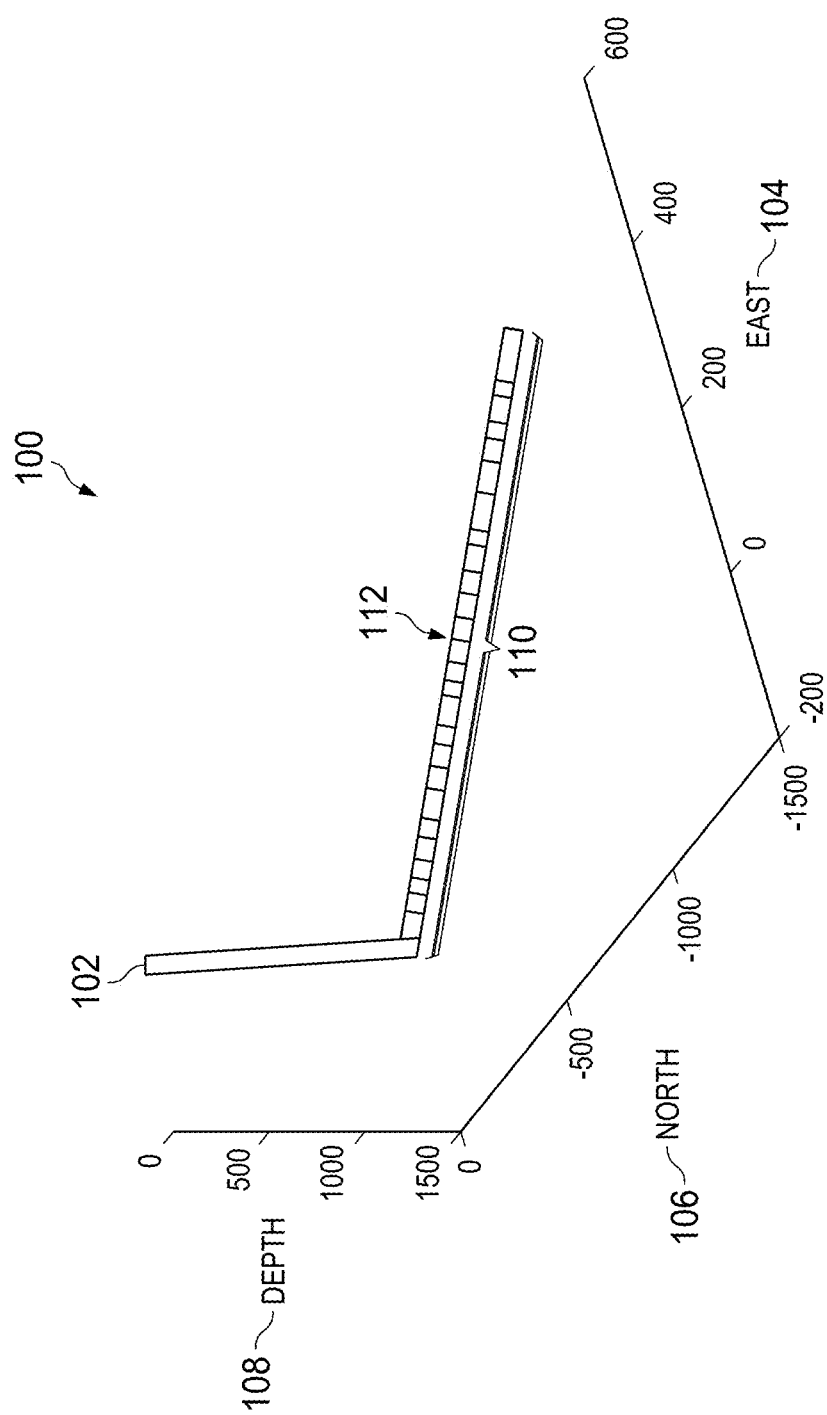
FIG. 1 is a map of a geometry of a well trajectory for a seismic while fracturing test, according to some implementations of the present disclosure.

The following detailed description describes techniques for generating interpretation results based on synchronized seismic data and fracture treatment times. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Some conventional hydraulic impedance testing or similar techniques may use water hammer signals. However, these techniques can be limited to wellhead pressure time series that are sampled no faster than 1 Hertz (Hz). Other techniques can be used to analyze wave reflections from fractures in the context of borehole acoustics. High-frequency signals, for example above 1 kilohertz (kHz), that are generated by borehole logging tools can be used to image fractures and porous layers. In contrast, the techniques described in the present disclosure can use low-frequency signals less than approximately 10 Hz. Conventional techniques that are used to infer the hydraulic fracture conductivity can rely on the installation of one-component sensors on the surface. The sensors can be installed near, at, or contacting the fluid inside the wellhead to acquire the tube waves. In some implementations, three-component sensors contacting the outside of the wellhead can be installed. Since tube waves are guided waves propagating along the wellbore, the wave motion includes x-, y-, and z-components. These components can be fully captured by one or more three-component sensors. As such, the techniques described in the present disclosure can utilize more comprehensive data to infer more accurate and robust subsurface fracture information as compared with conventional acquisition techniques using single-component sensors.

In some implementations, techniques can be used to infer fracture connectivity using tube waves reflected from the hydraulic fractures during the fracturing treatment. These techniques only need to process and interpret several channels of seismic data recorded by a three-component sensor contacting with the outside of the wellhead, for example. The interpreted results can be shown to provide a good match with fracturing treatment curves. The techniques can be used in real-time monitoring of hydraulic fracturing. The term real-time can correspond to events that occur within a specified period of time, for example, within hours, minutes, or seconds.

A main objective of Seismic While Fracking (SWF) systems is to provide real-time hydraulic fracture information to aid in decision-making during the fracking process. During conventional fracking operations, engineers may mainly rely on previous fracking information, ongoing fracking measurements, and well loggings that are obtained during intervals of different stages of fracking. This type of information is not available in real time, a situation that prevents engineers from making prompt decisions. Typical microseismic monitoring methods can require many sensors, which can add significant cost, time, and labor needed to process and interpret the data. The present disclosure presents cost-effective techniques for processing and interpreting seismic data collected, for example, by a single three-component sensor contacting the outside of a wellhead. The output of these techniques can include real-time conductivity parameters of hydraulic fractures.

Data Acquisition

FIG. 1 is a map of a geometry 100 of a well trajectory for a seismic while fracturing test, according to some implementations of the present disclosure. To obtain the geometry 100, a single three-component sensor can be placed on the surface, contacting the outside of the wellhead 102. The sensor can be connected with devices for data storage and battery. Since the sensor has only three channels, the data size can be small even though data recording might last several days. In this way, data processing and interpretation can be part of real-time monitoring of hydraulic fractures. The geometry 100 depicted in FIG. 1 is relative to x-, y-, and z-components given, for example, by an east direction 104, a north direction 106, and a depth direction 108. The geometry 100 can include 26 sections 110 having a geometry midpoint 112. In an example, the geometry midpoint 112 can be between the $13^{th}$ and $14^{th}$ segments of the 26 sections 110.

The three-component sensor can be designed to be broadband sensitive. The incident tube waves can be stimulated by pressure pulse in a wellbore, microseismic events, or a significant rapid fluid flow rate change such as water hammer. A water hammer can be caused, for example, by rapid injection or release of a slug of fluid or a sudden flow. The resulting stimulated tube waves can travel in the wellbore as guided waves (for example, as Stoneley waves). These guided waves can be converted into Krauklis waves when the waves encounter the boundary of the wellbore and fractures. Within the fractures, the Krauklis waves can reflect back and forth along major fracture connections, forming a standing wave with low attenuation. The Krauklis waves can be converted back into guided waves within the wellbore. Finally the guided waves can be reflected back to the surface and recorded by the surface sensor.

Figure 2A:
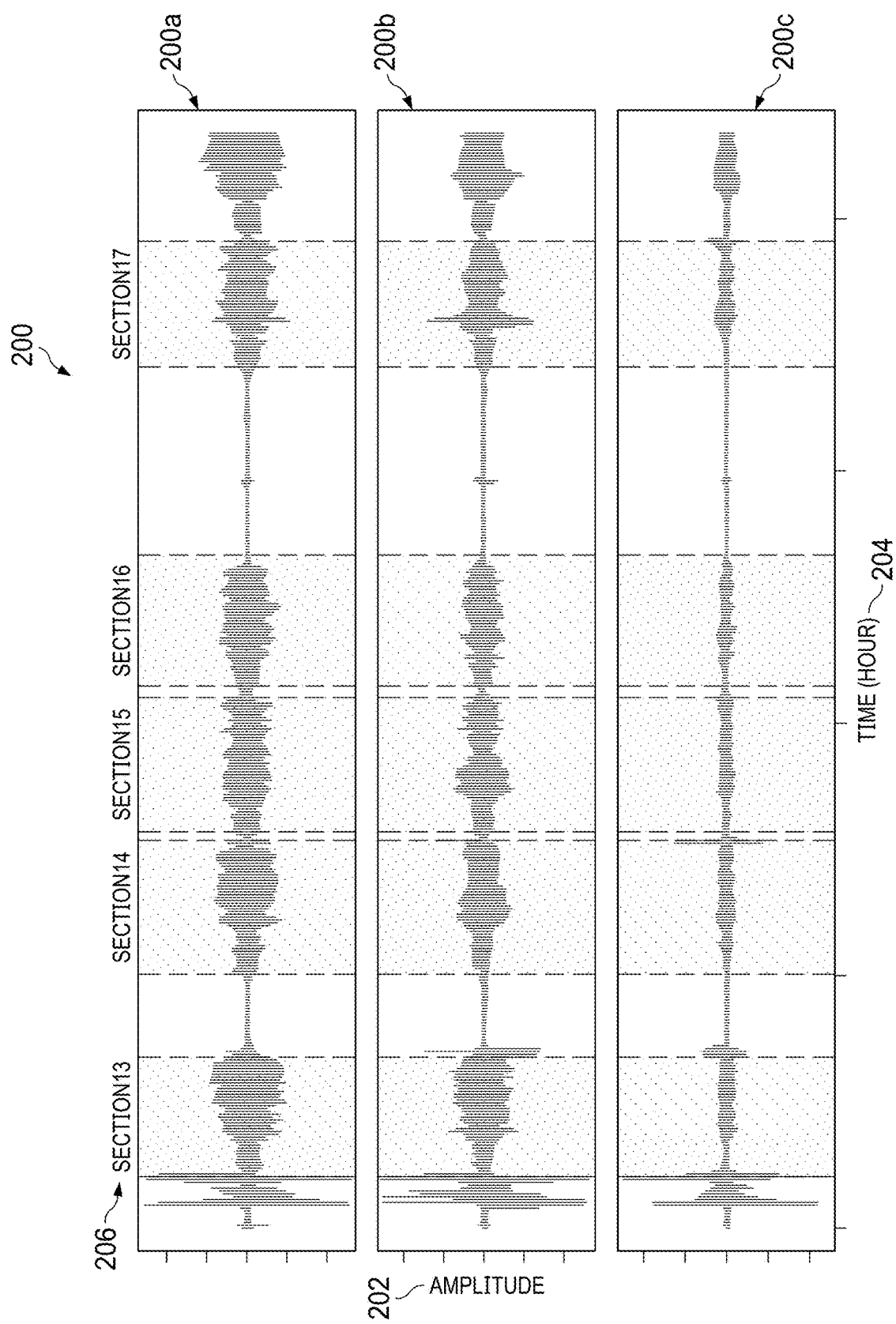

FIGS. 2A and 2B are diagrams showing raw data 200 for sensor recordings, according to some implementations of the present disclosure. FIG. 2A shows a three-component time series of the raw data that includes traces from x-, y-, and z-components 200a, 200b, and 200c, respectively. The components 200a-200c show signals plotted in FIG. 2A relative to amplitude 202 and time 204, where the signals correspond to sequential sections 206 of the wellbore (for example, corresponding to the sections 110).

FIG. 2B shows corresponding Fourier spectra for sensor recordings of x-, y-, and z-components 200a-200c, respectively, at three channels. The spectra include features of equidistant spectra lining up at a frequency 208 of 150 Hz. After overlaying the time windows of fracturing stages, the data can show consistent patterns at different stages. The plots for x-, y-, and z-components 200a-200c are plotted relative to amplitude 202, time 204 (hours), frequency 208 (Hz), and amplitude 210.

Data Processing Workflow

To estimate the fracture conductivity from the reflected tube waves, the raw data can be analyzed and processed. In some implementations, a data processing workflow for estimating the fracture conductivity can include the following. First, in a field data decode step, raw data can be downloaded from the sensor and converted to a standard format such as a Society of Exploration Geophysicists (SEG) Y (SEGY) format. Second, in an SEGY header edit step, SEGY headers including coordinates and recording times can be added to SEGY files. Third, in a time synchronization step, seismic recording times can be synchronized with the time of fracture treatments. Fourth, in a data quality control step, dead traces and abnormal data samples can be removed. Fifth, in a time-frequency analysis step, short-time Fourier transforms can be used to analyze the variation of the Fourier spectra over time. Sixth, an extraction of resonance frequency step can occur. For example, at every time sample, the resonance frequencies can be extracted from a frequency spectrum by stacking the spectrum with different frequency intervals. The resonance frequency is the frequency interval which gives the strongest stacking power.

Figure 3A:
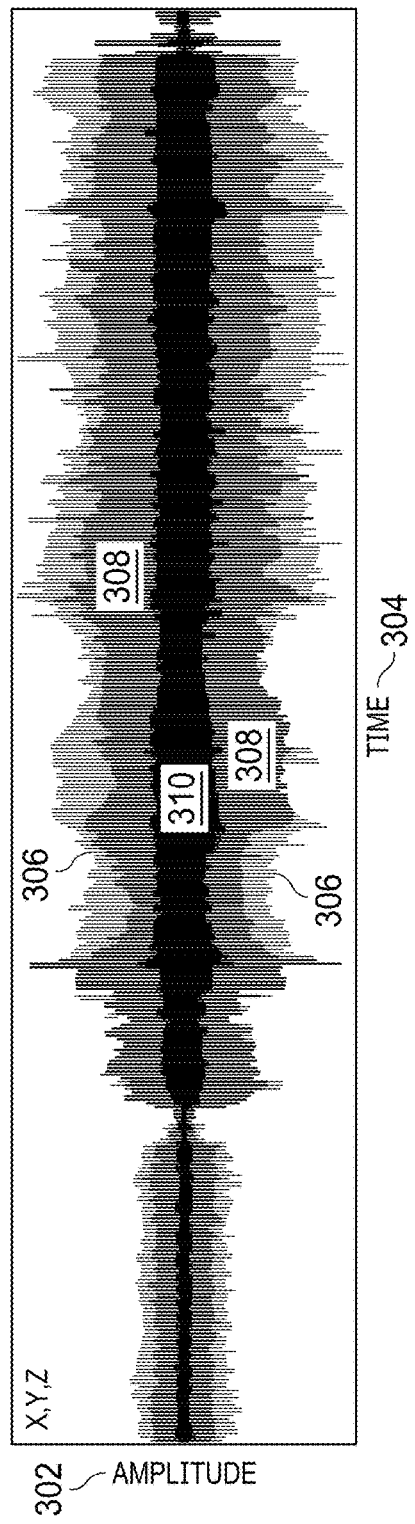
FIGS. 3A and 3B are plots showing a time-frequency analysis on seismic data, according to some implementations of the present disclosure.
Figure 3B:
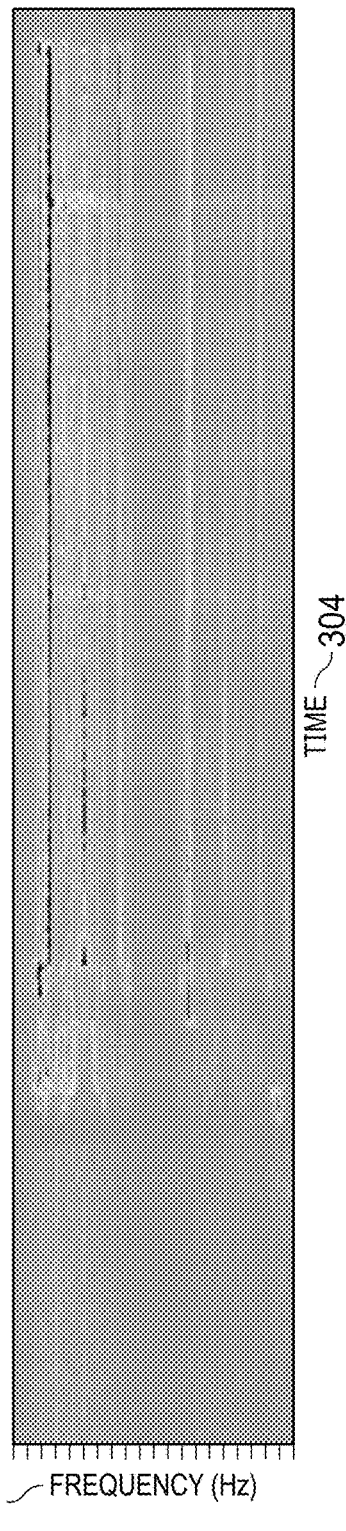

FIGS. 3A and 3B are plots 300a and 300b showing a time-frequency analysis on seismic data, according to some implementations of the present disclosure. The data processing results are shown for the seismic data acquired at the 13th stage of fracturing, for example. FIG. 3A shows three-component data, including the x-, y- and z-component data at the 13th stage of hydraulic fracturing, plotted relative to an amplitude axis 302 and a time axis 304. The plots 300a can be obtained, for example, by applying short-time Fourier transform to the three-component data and stacking their Fourier spectra. The plot 300 includes amplitudes for an x-component 306, a y-component 308, and a z-component 310. FIG. 3B shows the final time-frequency spectrum plotted relative to a frequency axis 312 and the time axis 304. The information can be recorded at a high rate, but analysis can focus on signals less than 10 Hz.

Data Interpretation

Figure 4A:
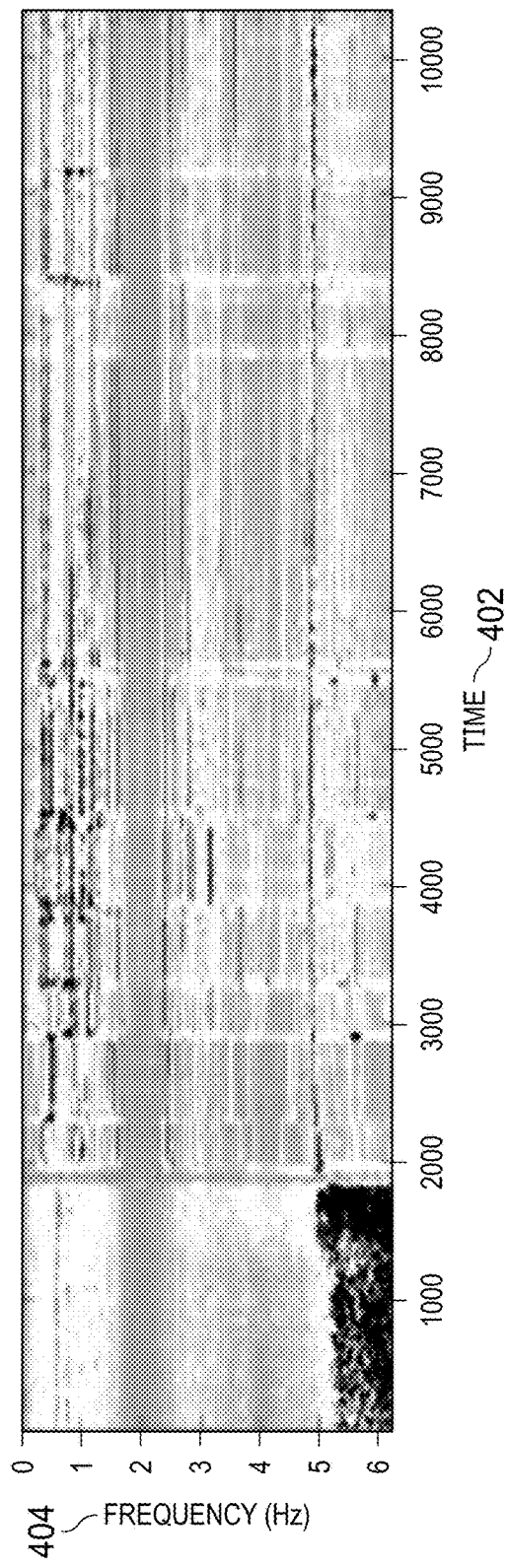
Figure 4B:
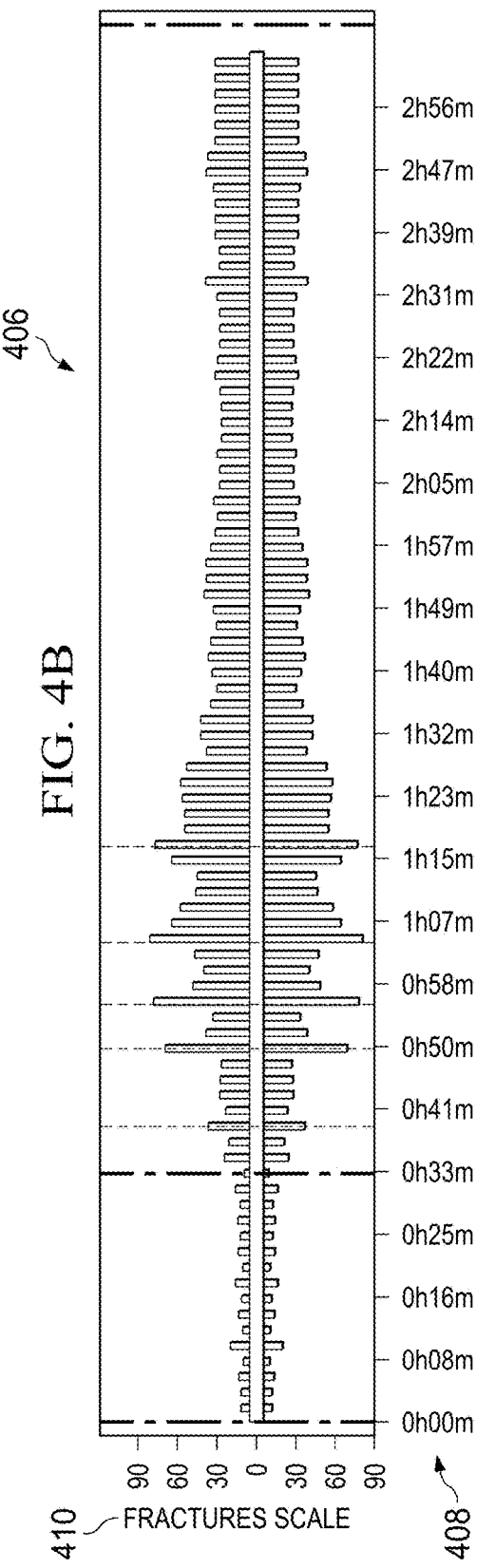

FIGS. 4A-4C are diagrams showing an interpretation of seismic data acquired at a 15th stage of fracturing, according to some implementations of the present disclosure. FIG. 4A shows a time-frequency spectrum 400, including showing the data interpretation results. The behavior of resonance frequencies 404 (for example, in Hz) plotted relative to a time axis 402 can be consistent with the pressure curves. Since newly-generated fractures release the stress in the stratum, the generation of fractures can be indicated by the pressure curve, where the pressure decreases rapidly with a stable injection of slurry. From the time-frequency spectrum, it can be determined that new fluid-filled cracks can generate new resonance frequencies. The reason for this is that the resonances originate from back-and-forth reflections of Krauklis waves within the space trapped by the perforation point and fracture tips.

FIG. 4B shows an interpretation result 406 relative to a time axis 408 and a fractures scale 410. For example, the resonance frequencies can be extracted from the time-spectrum, and the histogram of fracture conductivity can be calculated as shown in FIG. 4B.

FIG. 4C shows fracturing treatment curves 412. The trend of the histograms included in the fracturing treatment curves 412 is consistent with the pressure curves. To explain the interpretation result in detail, the 15th fracturing stage can be divided into three phases.

During a perforation stage 414 (from time A 416 to time B 418), a slurry with a low sand concentration can be been pumped into the coiled tubing. Sand can be injected into the target reservoir through a nozzle. In this phase, there are mainly natural fractures in the formations, thus the fracture conductivity is relatively low.

During a fracturing phase 420 (from time B 418 to time C 422), the fracturing treatment can start at the time B 418, and the pressure can increase with the slurry injection. The pressure begins to decrease when some fractures are generated. To generate more fractures, several rounds of slurry injections are often needed. In this example, there are five injection times. The interpretation result confirms that the fracture conductivity increases gradually along with the injection procedure.

During a fracturing phase 424 (from time C 422 to time D 426), the drainage volume and the connecting pipe pressure decreases, while the amount of sand concentration increases. The interpretation result shows that the hydraulic fractures in the formation gradually decrease when the fracturing pressure is reduced even though the sand-carrying fluid is gradually injected. Finally, the fracture conductivity tends to be stable as more and more proppant is injected into the formation.

The fracturing treatment curves 412 include line plots for a connecting pipe pressure 428, an annulus pressure 430, a slurry rate 432, a sand concentration 434, and an added liquid 436. Pressures such as the connecting pipe pressure 428 and the annulus pressure 430 can be measured in megapascal (MPa), for example. Slurry rates such as the slurry rate 432 can be measured in cubic meters per minute ($m^3$/min), for example. Sand concentrations such as the sand concentration 434 can be measured in kilograms per cubic meter ($kg/m^3$), for example. The added liquid 436 can be measured in liters per minute (L/min), for example. Line plots 428, 430, 432, 434, and 436 are plotted relative to their own units.

The interpretation results can show that the fracture conductivity extracted from resonance frequencies has a high correlation with the fracturing treatment curves, which can provide valuable information about fracturing quality in real time. Moreover, the fracturing pressure boosting time of section 13 can be performed in a short period. The conductivity factor that is calculated from the resonance frequencies can show stable fracture distribution during the whole fracturing treatment. Conductivity histograms at different stages can also be compared to provide an evaluation of fracturing quality during the entire hydraulic fracture treatment.

In some implementations, processing can be modified to account for contamination. For example, during data acquisition, the reflected tube waves may be contaminated by ambient noise (such as traffic noise, human activity, and pump noise). These contaminants can be accounted for in the calculations and the resulting plots.

Figure 5:
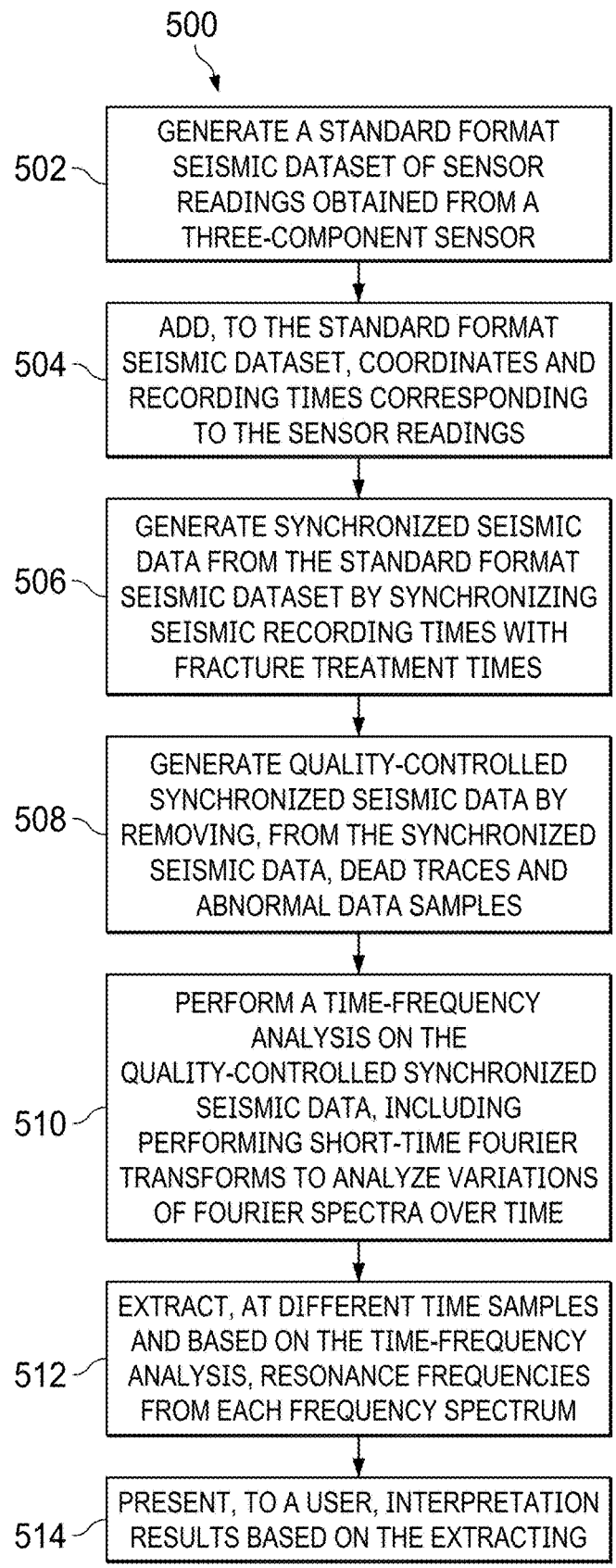
FIG. 5 is a flowchart of an example of a method for generating interpretation results based on synchronized seismic data and fracture treatment times, according to some implementations of the present disclosure.

FIG. 5 is a flowchart of an example of a method 500 for generating interpretation results based on synchronized seismic data and fracture treatment times, according to some implementations of the present disclosure. For clarity of presentation, the description that follows generally describes method 500 in the context of the other figures in this description. However, it will be understood that method 500 can be performed, for example, by any suitable system, environment, software, and hardware, or a combination of systems, environments, software, and hardware, as appropriate. In some implementations, various steps of method 500 can be run in parallel, in combination, in loops, or in any order.

At 502, a standard format seismic dataset of sensor readings obtained from a three-component sensor is generated. The sensor readings obtained from the three-component sensor include signals can be less than 10 Hertz, for example. The three-component sensor can be located outside of a wellhead, such as the wellhead 102. The sensor readings can be obtained during fracturing that occurs in a well according to the geometry 100 of the well trajectory for a seismic while fracturing test. Generating the standard format seismic dataset includes can include, for example, receiving raw data corresponding to the sensor readings obtained by the three-component sensor and generating the standard format seismic dataset by converting the raw data corresponding to the sensor readings into a standard format. The standard format can be a Society of Exploration Geophysicists (SEG) Y (SEGY) format, for example. From 502, method 500 proceeds to 504.

At 504, coordinates and recording times corresponding to the sensor readings are added to the standard format seismic dataset. As an example, adding the coordinates and the recording times can include updating SEGY headers of the standard format seismic dataset with the coordinates and recording times. From 504, method 500 proceeds to 506.

At 506, synchronized seismic data is generated from the standard format seismic dataset by synchronizing seismic recording times with fracture treatment times. Since the sensor is placed at the surface, the synchronization process is simple and can be performed by setting both the recording and fracturing time to be GPS (Global Positioning System) time. From 506, method 500 proceeds to 508.

At 508, quality-controlled synchronized seismic data is generated by removing dead traces and abnormal data samples from the synchronized seismic data. The anomalous data can be detected automatically according to their statistics attributes, including but not limited to the mean, variance, skewness, and kurtosis. From 508, method 500 proceeds to 510.

At 510, a time-frequency analysis is performed on the quality-controlled synchronized seismic data, including performing short-time Fourier transforms to analyze variations of Fourier spectra over time. The procedure for computing short-time Fourier transforms is to divide a longer time signal into shorter segments of equal length and then compute the Fourier transform separately on each shorter segment. Other time-frequency analysis tools, such as Gabor transforms and S transforms, can be used. From 510, method 500 proceeds to 512.

At 512, based on the time-frequency analysis, resonance frequencies are extracted at each time sample from the time-frequency spectra. For each time sample, the procedure includes applying Automatic Gain Control (AGC) to the frequency spectra, stacking the frequency spectra with different intervals, and finally picking the frequency interval with the highest-stacking energy as the estimated resonance frequency, where the AGC is applied to increase the amplitude of weak frequency components using a slide frequency window. This procedure is performed for all time samples. From 512, method 500 proceeds to 514.

At 514, interpretation results based on the extracting are presented to a user. Presenting the interpretation results based on the extracting can include generating a histogram of fracture conductivity, for example. The information can be displayed to a user (for example, an engineer associated with the fracking operation) in a user interface. After 514, method 500 can stop.

Figure 6:
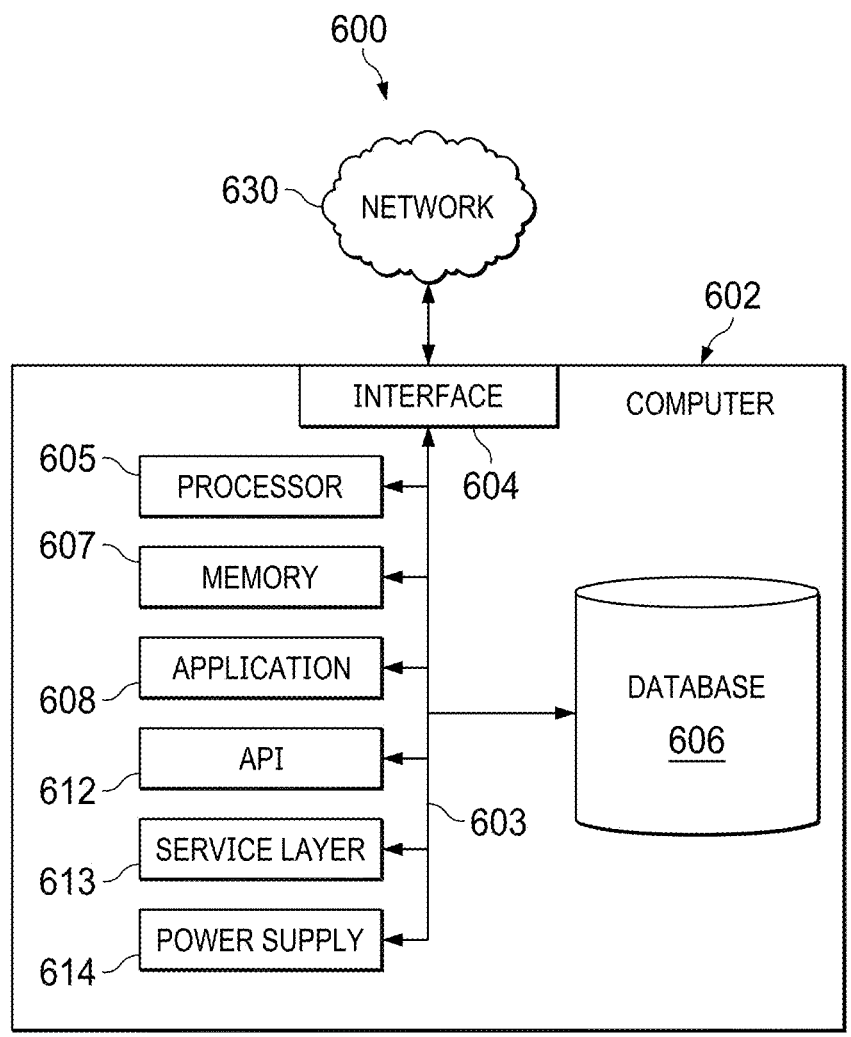
FIG. 6 is a block diagram illustrating an example computer system used to provide computational functionalities associated with described algorithms, methods, functions, processes, flows, and procedures as described in the present disclosure, according to some implementations of the present disclosure.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a top level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both) over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Described implementations of the subject matter can include one or more features, alone or in combination.

For example, in a first implementation, a computer-implemented method includes the following. A standard format seismic dataset of sensor readings obtained from a three-component sensor is generated. Coordinates and recording times corresponding to the sensor readings are added to the standard format seismic dataset. Synchronized seismic data is generated from the standard format seismic dataset by synchronizing seismic recording times with fracture treatment times. Quality-controlled synchronized seismic data is generated by removing dead traces and abnormal data samples from the synchronized seismic data. A time-frequency analysis is performed on the quality-controlled synchronized seismic data, including performing short-time Fourier transforms to analyze variations of Fourier spectra over time. Based on the time-frequency analysis, resonance frequencies are extracted from each frequency spectrum at different time samples. Interpretation results based are presented to a user.

The foregoing and other described implementations can each, optionally, include one or more of the following features:

A first feature, combinable with any of the following features, where the three-component sensor is located outside of a wellhead.

A second feature, combinable with any of the previous or following features, where generating the standard format seismic dataset includes: receiving raw data corresponding to the sensor readings obtained by the three-component sensor; and generating the standard format seismic dataset by converting the raw data corresponding to the sensor readings into a standard format.

A third feature, combinable with any of the previous or following features, where the standard format is a Society of Exploration Geophysicists (SEG) Y (SEGY) format.

A fourth feature, combinable with any of the previous or following features, where adding the coordinates and the recording times includes updating SEGY headers of the standard format seismic dataset with the coordinates and recording times.

A fifth feature, combinable with any of the previous or following features, where presenting the interpretation results based on the extracting includes generating a histogram of fracture conductivity.

A sixth feature, combinable with any of the previous or following features, where the sensor readings obtained from the three-component sensor include signals less than 10 Hertz.

In a second implementation, a non-transitory, computer-readable medium stores one or more instructions executable by a computer system to perform operations including the following. A standard format seismic dataset of sensor readings obtained from a three-component sensor is generated. Coordinates and recording times corresponding to the sensor readings are added to the standard format seismic dataset. Synchronized seismic data is generated from the standard format seismic dataset by synchronizing seismic recording times with fracture treatment times. Quality-controlled synchronized seismic data is generated by removing dead traces and abnormal data samples from the synchronized seismic data. A time-frequency analysis is performed on the quality-controlled synchronized seismic data, including performing short-time Fourier transforms to analyze variations of Fourier spectra over time. Based on the time-frequency analysis, resonance frequencies are extracted from each frequency spectrum at different time samples. Interpretation results based are presented to a user.

The foregoing and other described implementations can each, optionally, include one or more of the following features:

A first feature, combinable with any of the following features, where the three-component sensor is located outside of a wellhead.

A second feature, combinable with any of the previous or following features, where generating the standard format seismic dataset includes: receiving raw data corresponding to the sensor readings obtained by the three-component sensor; and generating the standard format seismic dataset by converting the raw data corresponding to the sensor readings into a standard format.

A third feature, combinable with any of the previous or following features, where the standard format is a Society of Exploration Geophysicists (SEG) Y (SEGY) format.

A fourth feature, combinable with any of the previous or following features, where adding the coordinates and the recording times includes updating SEGY headers of the standard format seismic dataset with the coordinates and recording times.

A fifth feature, combinable with any of the previous or following features, where presenting the interpretation results based on the extracting includes generating a histogram of fracture conductivity.

A sixth feature, combinable with any of the previous or following features, where the sensor readings obtained from the three-component sensor include signals less than 10 Hertz.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A standard format seismic dataset of sensor readings obtained from a three-component sensor is generated. Coordinates and recording times corresponding to the sensor readings are added to the standard format seismic dataset. Synchronized seismic data is generated from the standard format seismic dataset by synchronizing seismic recording times with fracture treatment times. Quality-controlled synchronized seismic data is generated by removing dead traces and abnormal data samples from the synchronized seismic data. A time-frequency analysis is performed on the quality-controlled synchronized seismic data, including performing short-time Fourier transforms to analyze variations of Fourier spectra over time. Based on the time-frequency analysis, resonance frequencies are extracted from each frequency spectrum at different time samples. Interpretation results based are presented to a user.

The foregoing and other described implementations can each, optionally, include one or more of the following features:

A first feature, combinable with any of the following features, where the three-component sensor is located outside of a wellhead.

A second feature, combinable with any of the previous or following features, where generating the standard format seismic dataset includes: receiving raw data corresponding to the sensor readings obtained by the three-component sensor; and generating the standard format seismic dataset by converting the raw data corresponding to the sensor readings into a standard format.

A third feature, combinable with any of the previous or following features, where the standard format is a Society of Exploration Geophysicists (SEG) Y (SEGY) format.

A fourth feature, combinable with any of the previous or following features, where adding the coordinates and the recording times includes updating SEGY headers of the standard format seismic dataset with the coordinates and recording times.

A fifth feature, combinable with any of the previous or following features, where presenting the interpretation results based on the extracting includes generating a histogram of fracture conductivity.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
   generating a standard format seismic dataset of sensor readings obtained from a three-component sensor comprising an x-component, a y-component, and a z-component of wave motions of guided waves propagated along a wellbore;
   adding, to the standard format seismic dataset, x/y/z coordinates and recording times corresponding to the sensor readings;
   generating, using the standard format seismic dataset of sensor readings, synchronized seismic data from the standard format seismic dataset by synchronizing seismic recording times with fracture treatment times;
   generating quality-controlled synchronized seismic data by removing, from the synchronized seismic data, dead traces and abnormal data samples;
   performing a time-frequency analysis on the quality-controlled synchronized seismic data, including performing short-time Fourier transforms to analyze variations of Fourier spectra over time;
   extracting, at different time samples and based on the time-frequency analysis, resonance frequencies from each frequency spectrum, including increasing amplitudes of weak frequency components of the quality-controlled synchronized seismic data using a slide frequency window, including applying automatic gain control (AGC) to frequency spectra, stacking the frequency spectra with different intervals, and picking a frequency interval with a highest-stacking energy as an estimated resonance frequency; and
   presenting, to a user, interpretation results based on the extracting.

2. The computer-implemented method of claim 1, wherein the three-component sensor is located outside of a wellhead.

3. The computer-implemented method of claim 1, wherein generating the standard format seismic dataset includes:
   receiving raw data corresponding to the sensor readings obtained by the three-component sensor; and
   generating the standard format seismic dataset by converting the raw data corresponding to the sensor readings into a standard format.

4. The computer-implemented method of claim 3, wherein the standard format is a Society of Exploration Geophysicists (SEG) Y (SEGY) format.

5. The computer-implemented method of claim 4, wherein adding the coordinates and the recording times includes updating SEGY headers of the standard format seismic dataset with the coordinates and recording times.

6. The computer-implemented method of claim 1, wherein presenting the interpretation results based on the extracting includes generating a histogram of fracture conductivity.

7. The computer-implemented method of claim 1, wherein the sensor readings obtained from the three-component sensor include signals less than 10 Hertz.

8. A non-transitory, computer-readable medium storing one or more instructions executable by a computer system to perform operations comprising:
   generating a standard format seismic dataset of sensor readings obtained from a three-component sensor comprising an x-component, a y-component, and a z-component of wave motions of guided waves propagated along a wellbore;
   adding, to the standard format seismic dataset, coordinates and recording times corresponding to the sensor readings;
   generating, using the standard format seismic dataset of sensor readings, synchronized seismic data from the standard format seismic dataset by synchronizing seismic recording times with fracture treatment times;
   generating quality-controlled synchronized seismic data by removing, from the synchronized seismic data, dead traces and abnormal data samples;
   performing a time-frequency analysis on the quality-controlled synchronized seismic data, including performing short-time Fourier transforms to analyze variations of Fourier spectra over time;

extracting, at different time samples and based on the time-frequency analysis, resonance frequencies from each frequency spectrum, including increasing amplitudes of weak frequency components of the quality-controlled synchronized seismic data using a slide frequency window, including applying automatic gain control (AGC) to frequency spectra, stacking the frequency spectra with different intervals, and picking a frequency interval with a highest-stacking energy as an estimated resonance frequency; and presenting, to a user, interpretation results based on the extracting.

9. The non-transitory, computer-readable medium of claim 8, wherein the three-component sensor is located outside of a wellhead.

10. The non-transitory, computer-readable medium of claim 8, wherein generating the standard format seismic dataset includes:

receiving raw data corresponding to the sensor readings obtained by the three-component sensor; and generating the standard format seismic dataset by converting the raw data corresponding to the sensor readings into a standard format.

11. The non-transitory, computer-readable medium of claim 10, wherein the standard format is a Society of Exploration Geophysicists (SEG) Y (SEGY) format.

12. The non-transitory, computer-readable medium of claim 11, wherein adding the coordinates and the recording times includes updating SEGY headers of the standard format seismic dataset with the coordinates and recording times.

13. The non-transitory, computer-readable medium of claim 8, wherein presenting the interpretation results based on the extracting includes generating a histogram of fracture conductivity.

14. The non-transitory, computer-readable medium of claim 8, wherein the sensor readings obtained from the three-component sensor include signals less than 10 Hertz.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:

generating a standard format seismic dataset of sensor readings obtained from a three-component sensor comprising an x-component, a y-component, and a z-component of wave motions of guided waves propagated along a wellbore;

adding, to the standard format seismic dataset, coordinates and recording times corresponding to the sensor readings;

generating, using the standard format seismic dataset of sensor readings, synchronized seismic data from the standard format seismic dataset by synchronizing seismic recording times with fracture treatment times;

generating quality-controlled synchronized seismic data by removing, from the synchronized seismic data, dead traces and abnormal data samples;

performing a time-frequency analysis on the quality-controlled synchronized seismic data, including performing short-time Fourier transforms to analyze variations of Fourier spectra over time;

extracting, at different time samples and based on the time-frequency analysis, resonance frequencies from each frequency spectrum, including increasing amplitudes of weak frequency components of the quality-controlled synchronized seismic data using a slide frequency window, including applying automatic gain control (AGC) to frequency spectra, stacking the frequency spectra with different intervals, and picking a frequency interval with a highest-stacking energy as an estimated resonance frequency; and presenting, to a user, interpretation results based on the extracting.

16. The computer-implemented system of claim 15, wherein the three-component sensor is located outside of a wellhead.

17. The computer-implemented system of claim 15, wherein generating the standard format seismic dataset includes:

receiving raw data corresponding to the sensor readings obtained by the three-component sensor; and generating the standard format seismic dataset by converting the raw data corresponding to the sensor readings into a standard format.

18. The computer-implemented system of claim 17, wherein the standard format is a Society of Exploration Geophysicists (SEG) Y (SEGY) format.

19. The computer-implemented system of claim 18, wherein adding the coordinates and the recording times includes updating SEGY headers of the standard format seismic dataset with the coordinates and recording times.

20. The computer-implemented system of claim 15, wherein presenting the interpretation results based on the extracting includes generating a histogram of fracture conductivity.

* * * * *